United States Patent [19]

Shires

[11] Patent Number: 5,167,028
[45] Date of Patent: Nov. 24, 1992

[54] SYSTEM FOR CONTROLLING TASK OPERATION OF SLAVE PROCESSOR BY SWITCHING ACCESS TO SHARED MEMORY BANKS BY MASTER PROCESSOR

[75] Inventor: Glen E. Shires, Santa Clara, Calif.

[73] Assignee: Lucid Corporation, Richardson, Tex.

[21] Appl. No.: 435,053

[22] Filed: Nov. 13, 1989

[51] Int. Cl.⁵ .................. G06F 12/12; G06F 9/44
[52] U.S. Cl. .................. 395/425; 364/228.1;
364/230.4; 364/246.1; 364/254.7; 364/270.7;
364/271.5; 364/931.46; 364/942.4; 364/957.7;
364/960.2; 364/966.6; 364/DIG. 1; 395/725
[58] Field of Search ... 364/200 MS File, 900 MS File, 364/134; 395/725, 425

[56] References Cited

U.S. PATENT DOCUMENTS

| | | | |
|---|---|---|---|
| 3,969,723 | 7/1976 | Kennicott | 364/200 |
| 4,567,560 | 1/1986 | Polis et al. | 364/184 |
| 4,591,975 | 5/1986 | Wade et al. | 364/200 |
| 4,858,107 | 8/1989 | Fedele | 364/200 |
| 4,945,479 | 7/1990 | Rusterholz et al. | 364/200 |
| 5,008,812 | 4/1991 | Bhandarkar et al. | 364/200 |

FOREIGN PATENT DOCUMENTS 61-29908 2/1986 Japan.

Primary Examiner—Thomas C. Lee
Assistant Examiner—Ken S. Kim
Attorney, Agent, or Firm—Timmons & Kelly

[57] ABSTRACT

A Multiprocessor system is disclosed which includes a master processor, slave processor, and first and a second bank of memory for storing information to be operated on by the slave processor and a switch controlled by a master processor to switch the functional position of two banks of memory so that the slave processor switches from operating on information stored in the first bank to operating on information stored in the second bank and back under the control of the master processor.

2 Claims, 3 Drawing Sheets

SYSTEM FOR CONTROLLING TASK OPERATION OF SLAVE PROCESSOR BY SWITCHING ACCESS TO SHARED MEMORY BANKS BY MASTER PROCESSOR

DESCRIPTION

1. Technical Field

The present invention relates generally to methods and apparatus for communicating between processors and, in one of its aspects, to methods and apparatus for a master processor to control a slave processor.

It is common in multiprocessing systems for one processor, known as the master processor, to control another processor, known as the slave processor. Such systems are often limited by the speed of interprocessor communication.

2. Background Art

It is common in multiprocessing systems for processors to communicate by reading and writing information to shared memory or input/output ports. The word "information" is used here to refer to any combination of code and data. It is common in multiprocessing systems for a master processor to control a slave processor indirectly by controlling the information in memory on which the slave processor operates. Referring now to FIG. 1, a typical multiprocessor system is referred to generally by reference numeral .0. Multiprocessor system 10 includes a master processor 12 with a master memory area 14 that it has access to, as well as a slave processor 16 with a slave memory area 18 that it has access to. Often, but not always, the master memory area includes memory 20 dedicated to the master which the slave cannot access. Similarly, often, but not always, the slave memory area includes memory 22 dedicated to the slave which the master cannot access. The key to traditional interprocessor communication is typically a shared memory area 24 (or similarly, a shared input/output port).

When the master processor wants to pass information to the slave processor, it writes the information into the shared memory. This information may take the form of data for the slave to interpret or ac* upon, or may be actual code that the slave processor will execute to perform a required task. The slave processor will, at some point, read this information from the shared memory and act upon it.

When the master processor wants to get information from the slave processor, the slave processor first writes the information to the shared memory and the master processor later reads it from the shared memory. Typically, before this occurs, the master processor must first write to the shared memory to indicate to the slave processor what type of information it wants, and only after the slave processor has a chance to respond will the requested information be available to be read by the master processor.

The method in which the master processor indicates to the slave processor what task to perform can be sped up by having a table containing the code for several tasks already stored in the slave's shared or dedicated memory and having the master write only an index pointer to the shared memory for each new task requested. But the slave still must interpret this index pointer by either interrogating it as data or even by directly executing it, and this step takes time. Also, even though several tasks may be queued up at once, additional time is required to insure that the processor stays in synchronization so that the master processor does request more tasks than can fit in the shared memory and that the master processor does not attempt to read information from the shared memory before the slave processor has put it there.

It can thus be seen that traditional interprocessor communication relies on shared memory locations or input/output ports which are written by one processor and sensed or acted upon by another, either by executing it as code or reading and interpreting it as data. In addition, either one processor must spend time waiting for the other processor to respond or must implement some protocol so that the processors remain in synchronization. The problem with this method is that each of these various activities take a significant amount of time overhead for the processor to execute the code that implements these steps.

Bank switching is a technique that has been used in other than multiprocessor systems. Referring now to FIG. 2, a typical single processor system is referred to generally by reference numeral 30. System 30 includes a processor 32 and its memory area 34 that it has access to. Within this memory area may or may not be some normal non-bank-switched memory 36. Also within this memory area is a region of memory 38 that provides access to one of the individual banks 40, 42, 44, and 46 which make up the bank-switched memory. Only one bank can be accessed at a time and is selected by a hardware circuitry "switch" 48. The processor itself controls the selection of which bank is to be used by writing the appropriate data to a memory location or input/output port that controls hardware "switch" 48, and then can perform read and write accesses to the individual bank. To access a different bank, the processor must first write different data to the location that controls "switch" 48.

Typically this technique is used to allow a processor to access more memory than it has direct access to, or to access memory in an order which is different from directly mapped memory. It is completely unrelated to interprocessor communication because all of the memory and controls relate to only one processor.

DISCLOSURE OF INVENTION

In accordance with the present invention, a multiprocessing system includes a master processor, a slave processor, a shared memory which is split into two or more banks, and some means controlled by the master processor for switching the slave processor between the two banks. In such an arrangement, information is stored in the first bank of memory which would have the slave processor perform on task. Likewise, information is stored in the other banks which would have the slave processor perform one task. Likewise, information is stored in the other banks which would have the slave processor perform other tasks. The slave processor begins by operating on the information in one of the tasks, but when the master processor wishes for the slave processor to begin operation of another task, the hardware switches in the new bank in place of the old bank such that the slave processor will perform the new task.

In a preferred form, such a method would include initiating the switch automatically when the master processor requires information that is only available to the slave processor and the actual switch would be delayed until the slave is ready to begin a new task, which is also automatically determined by waiting until the slave processor jumps back to the beginning of the code in the bank. In this way, the master processor has no additional overhead, and the slave processor executes a minimum amount of code to perform each task, and then smoothly transitions to the next task.

These and other objects, advantages and features of this invention will be apparent from the following description taken with reference to the accompanying drawing, wherein is shown the preferred embodiments of the invention.

BEST MODE FOR CARRYING OUT THE INVENTION

Figure 1:
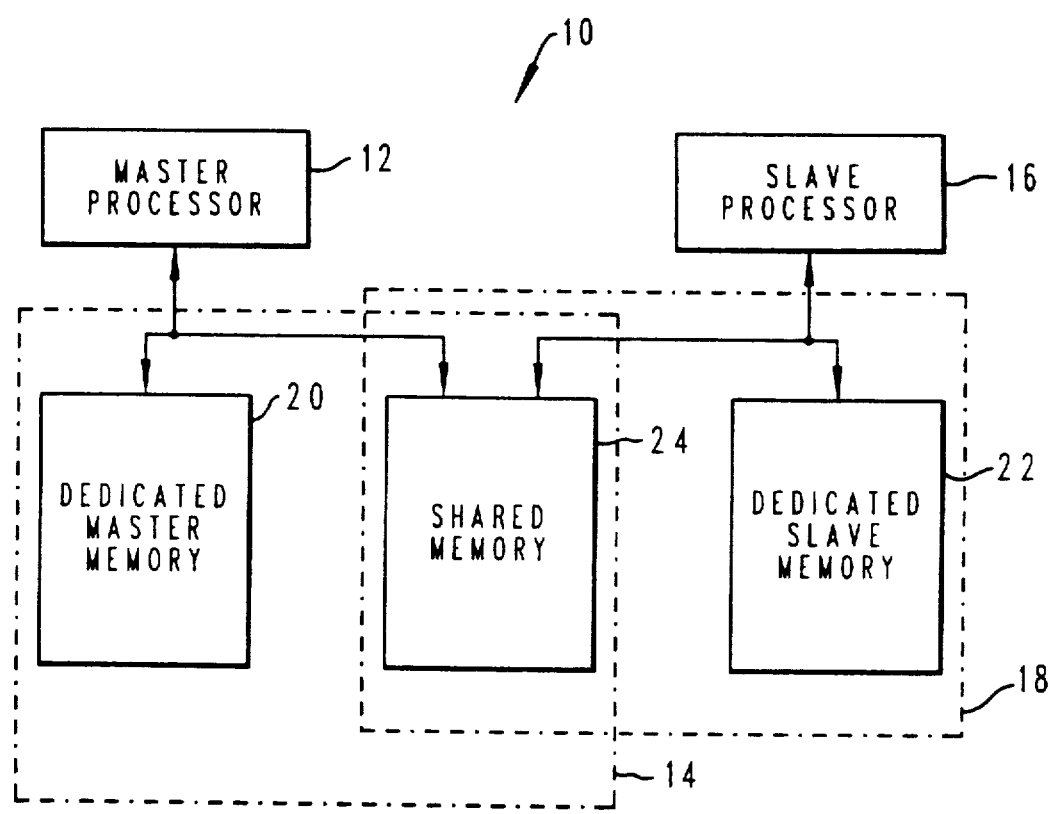
FIG. 1 is a block diagram representation of a typical multiprocessor system of the prior art.
Figure 2:
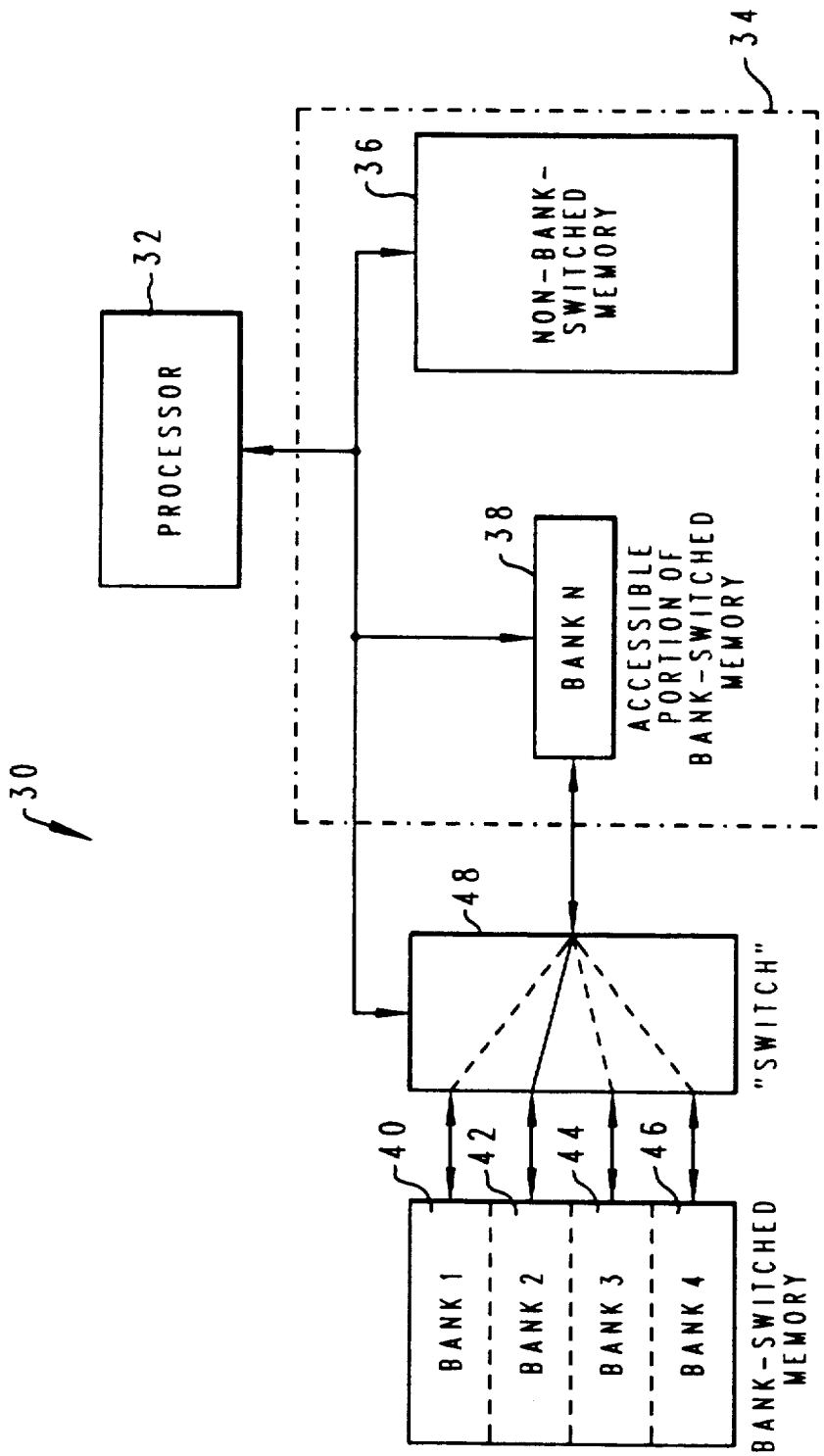
FIG. 2 is a block diagram representation of a typical bank-switched single-processor system of the prior art.
Figure 3:
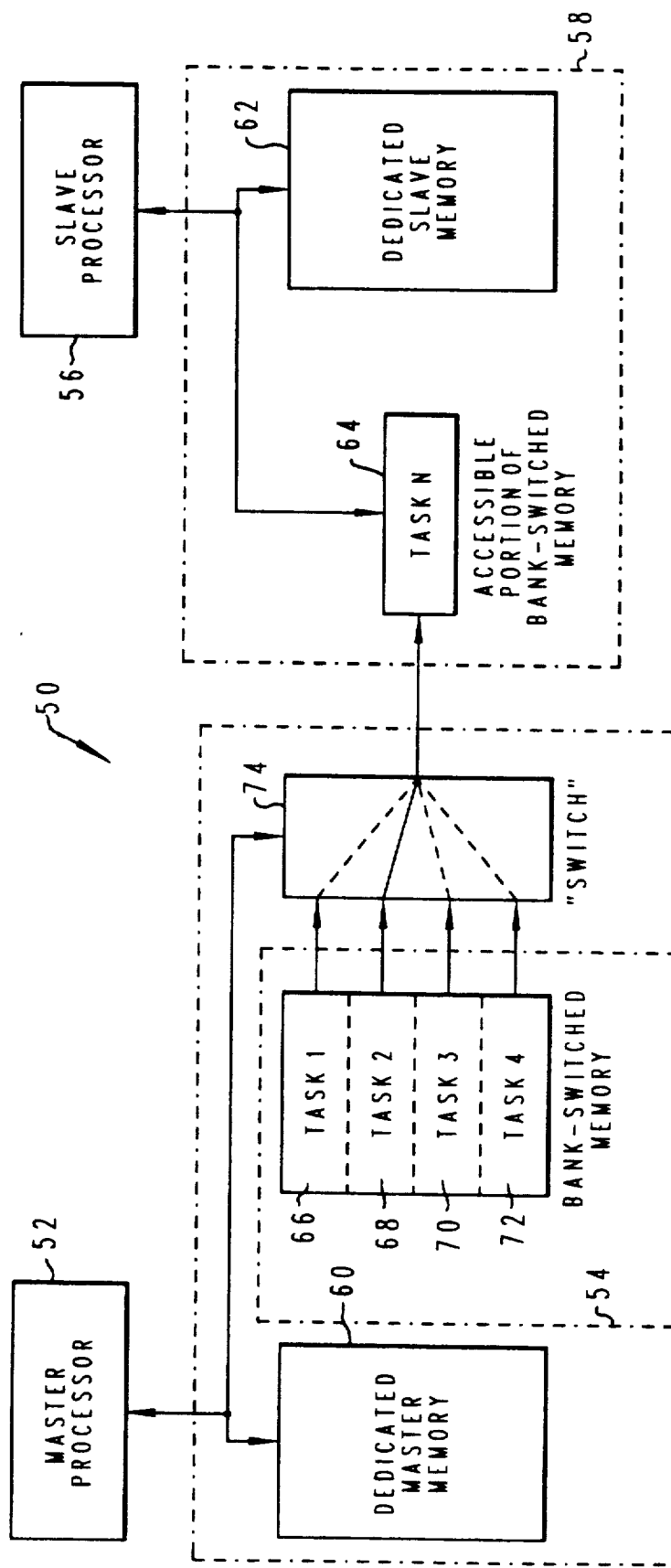
FIG. 3 is a block diagram representation of a multiprocessor system according to the present invention.

Referring now to the drawing and in particular to the FIG. 3, a multiprocessor system according to the present invention is referred to generally by reference numeral 50. Multiprocessor system 50 includes a master processor 52 with a master memory area 54 that it has access to, as well as a slave processor 56 with a slave memory area 58 that it has access to. Often, but not always, the slave memory area includes memory 62 dedicated to the slave which the master cannot access. The key to the interprocessor communication for the present invention is that also within this slave memory area is a region of memory 64 that provides access to one of the individual banks 66, 68, 70 and 72 which make up the bank-switched memory. Only one bank can be accessed at a time and is selected by the hardware circuitry "switch" 74.

Each bank contains a set of instructions and information for the slave processor to complete a type of task that the master processor may, at some point, require the slave processor to perform. The slave processor simply executes code out of region 64 to perform whatever task is currently accessible. Whenever the master processor changes the hardware "switch" 74, the slave processor will begin executing a different task. It can thus be seen that a method for controlling the operation of slave processor 56 by master processor 52 requires only that the master processor change the hardware "switch" 74 so that a different task is accessible by the slave processor and requires no additional instructions or overhead of the slave processor Also, the information in the individual banks 66, 68, 70, and 72 can be predetermined and does not need to be changed. The master processor only needs to set "switch" 74 to select which bank, and thus which task, is to be run at the moment.

Since the "switch" is completely transparent to the slave processor, care must be taken to insure that it is not performed during a critical part of the task in which the slave processor is performing. In a preferred embodiment, all of the tasks start at the same memory offset address within each bank and finish by returning to that same starting memory offset address. Special hardware circuitry insures that any pending new "switch" selection that the master processor has requested does not take effect until just before the slave processor reads the first instruction of the next task at this memory offset address. In this way, the slave processor is guaranteed to complete the current task and smoothly switch to the next task with no software overhead required of either the master processor or the slave processor. The preferred embodiment also has an "Idle" task in one of the banks which is selected automatically when the current task completes and the master processor currently has no tasks for the slave processor to perform, in which case the slave processor simply runs a null task.

Also, in this preferred embodiment, certain types of master processor accesses, such as input/output accesses and memory accesses to certain addresses, are automatically interpreted by the hardware to initiate a new selection for "switch" 74. In this way, even the software overhead for the master to initiate the new selection is eliminated.

Also, in a preferred embodiment, a memory location or port is used to allow the slave processor to return data directly to the master processor for tasks, such as memory reads, in which the master processor requires data. The hardware of such a location is such that the slave processor may write to it, and the data is automatically read by the master processor in the course of completing a memory or input/output read instruction which has initiated a bank-switch task. By such a means the master processor may initiate an entire task and receive back the requested data all by executing only a single bus access cycle, which further reduces the software overhead of the master processor.

It is now clear to see that the present invention has several advantages over the interprocessor communication prior art. The need for the master processor to write specific information to a shared memory, the need for the slave processor to read, interpret and act upon the master processor's task selection request, and the need for both the master processor and the slave processor to remain in synchronization are all eliminated from the software requirement, and therefore a significant amount of software and time overhead is eliminated.

It is also now clear to see that unlike bank-switching prior art, the master processor selects the bank for the slave processor, also the change only takes effect at a time when the slave processor can make the transition smoothly. Also, in one preferred embodiment, the "switch" selection is made automatically due to certain types of master processor accesses rather than an explicit write to a memory or input/output location.

It is easy to see that the present invention provides an extremely rapid method of interprocessor communication and is one well adapted for use on accelerator boards as well as in other multiprocessor systems.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawing is to be interpreted as illustrative and not in a limiting sense.

I claim:

1. A method for controlling the operation of a slave processor by a master processor using multiple banks of memory, comprising in combination the steps of:

making instruction code task information in all banks such that they begin at a consistent starting offset address within each bank and finish by returning to the same starting offset address;

allowing the slave processor to execute instruction code information stored in a first bank to perform a task;

monitoring the memory offset address where the slave processor is operating in the first bank;

delaying a pending switch to a second bank that the master processor has requested until just before the slave processor reads the first instruction of the next task at the memory offset address, whereby the slave processor can complete the current task and smoothly switch to the next task with substantially no software overhead required of either the master processor or the slave processor; and switching by the master processor of the functional position of the banks whereby the slave processor executes instruction code information stored in another bank to perform another task.

2. A method according to claim 1 further comprising the steps of:

storing an "Idle" instruction code task in one of the banks; and selecting the "Idle" instruction code task for the slave processor automatically when a current task completes and the master processor currently has no tasks for the slave processor to perform, whereby the slave processor runs a null task.

* * * * *